US012808990B2

(12) United States Patent
Lohan et al.

(10) Patent No.: US 12,808,990 B2
(45) Date of Patent: Nov. 24, 2026

(54) SYSTEMS AND METHODS FOR LIDAR PACKAGE COOLING

(71) Applicant: Toyota Motor Engineering & Manufacturing North America, Inc., Plano, TX (US)

(72) Inventors: Danny J. Lohan, Northville, MI (US); Ercan Mehmet Dede, Ann Arbor, MI (US); Paul Donald Schmalenberg, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 910 days.

(21) Appl. No.: 18/128,022

(22) Filed: Mar. 29, 2023

(65) Prior Publication Data

US 2024/0329206 A1 Oct. 3, 2024

(51) Int. Cl.
*G01S 7/481* (2006.01)
*G01S 17/931* (2020.01)

(52) U.S. Cl.
CPC .......... *G01S 7/4813* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 7,344,279 | B2 | 3/2008 | Mueller et al. | |
| 8,619,426 | B2 | 12/2013 | Chamseddine et al. | |
| 8,659,903 | B2 | 2/2014 | Schwartz | |
| 10,042,123 | B2 | 8/2018 | Rinzler et al. | |
| 10,295,656 | B1 | 5/2019 | Li et al. | |
| 10,429,495 | B1 | 10/2019 | Wang et al. | |
| 11,240,941 | B2 | 2/2022 | Frederick et al. | |
| 2019/0210423 | A1* | 7/2019 | Ghannam | B60H 1/00271 |
| 2020/0084920 | A1* | 3/2020 | Frederick | G05D 1/0088 |
| 2023/0011457 | A1* | 1/2023 | Lu | H01S 5/02415 |
| 2023/0095150 | A1* | 3/2023 | Phinisee | F24H 9/2071 374/179 |

* cited by examiner

*Primary Examiner* — Luke D Ratcliffe
(74) *Attorney, Agent, or Firm* — Christopher G. Darrow; Darrow Mustafa PC

(57) ABSTRACT

Systems, methods, and other embodiments described herein relate to cooling a circuit package. In one embodiment, a light detection and ranging system has a first circuit separated from a second circuit by an airflow pathway. An access mechanism may be positioned in the airflow pathway and configured to divert airflow around the first circuit and toward the second circuit via the airflow pathway until a package condition is encountered that triggers the access switch to a second cooling position allowing airflow to flow to the airflow pathway unimpeded.

20 Claims, 4 Drawing Sheets

SYSTEMS AND METHODS FOR LIDAR PACKAGE COOLING

TECHNICAL FIELD

The subject matter described herein relates, in general, to light detection and ranging (LiDAR) systems and, more particularly, to providing dynamic cooling to a LiDAR circuit package utilizing operating temperature sensitive circuitry.

BACKGROUND

As vehicles advance towards more intelligence and automation, vehicle sensors are tasked with increasing volumes of data gathering. The performance of many sensors, such as detection speed and object identification accuracy, can influence the ability of a vehicle to function as completely autonomous units. Meanwhile, the physical size of sensors can influence what circuitry is incorporated into a sensor and where the sensor can be placed in a vehicle. As a result, current vehicle sensors compromise between physical size and sensing performance to provide relatively slow and inaccurate detection of objects and surfaces downrange of a vehicle.

While technology currently exists to increase the performance and/or reliability of vehicle sensors, the physical size and cooling capabilities of circuit packages have limited the ability to implement such technology into functional vehicle sensors. That is, the lack of effective circuitry cooling in small-scale vehicle sensors has limited the incorporation of circuitry with high sensitivity to operating temperatures into vehicles to sensors with relatively large physical footprints and hefty cooling means. Hence, there is a continued emphasis in increasing the cooling capabilities of vehicle sensors while reducing the physical size of a sensor to allow sophisticated, and often performance dependent on operating temperature, to be employed.

SUMMARY

In one embodiment, example systems and methods relate to a manner of improving cooling in a light detection and ranging (LiDAR) circuit package.

In one embodiment, a LiDAR system has a circuit package that consists of a first circuit separated from a second circuit by an airflow pathway. An access switch may be positioned in the airflow pathway and configured to divert airflow around the first circuit and toward the second circuit via the airflow pathway until a package condition is encountered that triggers the access switch to a second cooling position that allows airflow to flow to the airflow pathway unimpeded.

In one embodiment, a LiDAR system has a single circuit package is positioned on a leading surface of a vehicle and consists of a first circuit separated from a second circuit by an airflow pathway. A first access switch is positioned in the circuit package to restrict airflow to a first portion of the airflow pathway while a second access switch is positioned in the circuit package to restrict airflow to a second portion of the airflow pathway. The first access switch and the second access switch collectively divert airflow around the first circuit until activated in response to an encountered package condition which triggers the access switch to a second cooling position allowing airflow to flow to the airflow pathway unimpeded In one embodiment, a method for cooling a LiDAR circuit package involves diverting airflow around a first circuit with an access switch positioned in an airflow pathway that separates the first circuit from a second circuit in the circuit package. Activating the access switch in response to an encountered package condition articulates the access switch to a cooling position that allows airflow to reach a rear surface of the first circuit prior to entering the airflow pathway.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving cooling and thermal management in a LiDAR system are disclosed herein. As previously described, LiDAR circuitry can be sensitive to operational temperature, particularly when contained in a single circuit package with a small form factor. In this way, the disclosed systems, methods, and other embodiments improve cooling in a circuit package with a small form factor to mitigate the operational sensitivity of constituent LiDAR circuitry.

Figure 1:
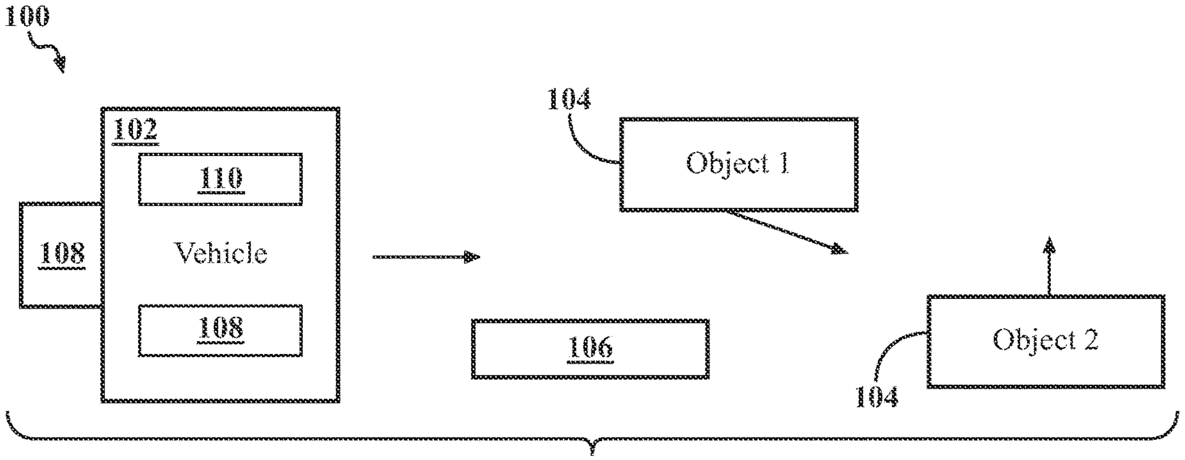
FIG. 1 illustrates one embodiment of a vehicle within which systems and methods disclosed herein may be implemented.

Referring to FIG. 1, an example of an environment 100 is illustrated in which a vehicle 102 can operate to detect objects 104 and surfaces 106 located downrange. As used herein, a "vehicle" is any form of motorized transport. In one or more implementations, the vehicle 102 is an automobile. While arrangements will be described herein with respect to automobiles, it will be understood that embodiments are not limited to automobiles. In some implementations, the vehicle 102 may be any robotic device or form of motorized transport that, for example, includes sensors to perceive aspects of the surrounding environment, and thus benefits from the functionality discussed herein associated with the utilization of LiDAR circuitry employing optimized cooling.

The vehicle 102 also includes various elements. It will be understood that in various embodiments it may not be required or limiting for the vehicle 102 to have all of the elements shown in FIGS. 1-6. The vehicle 102 can have different combinations of the various elements shown in FIGS. 1-6. Further, the vehicle 1-6 can have additional elements to those shown in FIGS. 1-6. In some arrangements, the vehicle 102 may be implemented without one or more of the elements shown in FIGS. 1-6. While the various elements are shown as being located within the vehicle 102 in FIGS. 1-6, it will be understood that one or more of these elements can be located external to the vehicle 102. Further, the elements shown may be physically separated by large distances.

It is noted that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 102 includes a LiDAR system that employs a circuit package with dynamic cooling that allows for optimized performance in a reduced physical form factor.

The incorporation of sensors 108 into the vehicle 102 can allow for increased autonomy as information about the vehicle 102, area immediately around the vehicle 102, and area downrange of the vehicle 102 are collected and processed by a vehicle processor 110. While shown as an on-board vehicle component, it is noted that processing and other computing capabilities can be conducted away from the vehicle 102 and communicated to on-board computing means 110 via one or more data pathways.

Assorted sensors 108 of the vehicle 102 can operate continuously, sporadically, or randomly to collect information about one or more aspects of the vehicle 102, downrange objects 104, and downrange surfaces 106. That is, a vehicle sensor array can consist of sensors 108 that have redundant, or unique, configurations that detect common, or dissimilar, types of information. For example, a first sensor 108 can be a LiDAR sensor that emits optical beams to detect downrange objects 104 and surfaces 106 while a second sensor 108 is a camera, acoustic detector, pressure detector, or temperature detector that collectively sense the presence of downrange objects 104 and surfaces 106.

The detection of aspects of the field of view downrange of the vehicle 102 can be complicated by the movement of one or more objects 104, as conveyed by solid arrows. The combination of stationary downrange aspects, such as a surface 106, along with objects 104 moving in different directions, and at potentially different velocities, further complicate the accurate detection and identification of the downrange environment. Movement of the vehicle 102, as conveyed by solid arrow 112, can add an additional layer of complexity to object 104 and surface 106 detection, particularly in a time horizon that involves computer processing of collected information to identify where, and how, the vehicle 102 can travel through the downrange environment safely.

Figure 2:
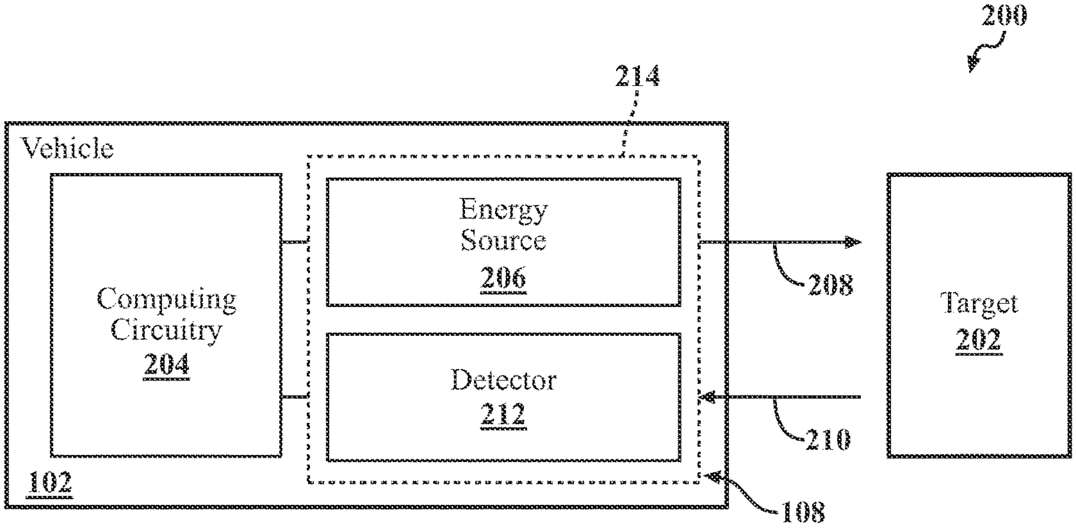
FIG. 2 illustrates aspects of an embodiment of a LiDAR system that can be practiced in the vehicle of FIG. 1.

With reference to FIG. 2, embodiments of a LiDAR system 200 of are illustrated that can individually, or collectively, be employed in the environment 100 of FIG. 1. Although not required or limiting, FIG. 2 conveys a single sensor 108 that is integrated into, or onto, a vehicle 102. The sensor 108 can employ any number, type, and function of circuitry that allows fast and accurate detection of a target 202 positioned at any distance downrange of the vehicle/sensor.

The example LiDAR system 200 shown in FIG. 2 employs computing circuitry 204, such as a memory, microprocessor, controller, or other programmable circuit, to operate at least one optical energy source 206 to emit optical beam(s) 208 that bounce off downrange targets 202 and return as energy 210 that is sensed by a one or more detector 212. The collection of information about emitted energy 208 and return energy 210 allows the computing circuitry 204 to process the data to determine the shape, size, and velocity of the target 202 as well as the distance to the target 202.

In an effort to provide fast and accurate operation, the operating temperature of the optical components 214 can be prioritized by providing ample airflow to, and around, the circuitry of at least the energy source 206 and detector(s) 208. Such airflow is often facilitated by separating the optical components 214 with space and/or static cooling members, such as fins, sinks, or coatings, which increases the overall physical size and form factor of the sensor 108. The addition of the computing circuitry 204 to a sensor 108 can further complicate cooling, and increase sensor size, by providing a different peak performance operating temperature range than the circuitry of the optical components 214. That is, different circuits can generate different amounts of heat and heat dissipation capabilities that cause sensor 108 design to compromise between higher performance and physical size due to physically larger sizes providing greater performance consistency and less operational temperature variability.

Accordingly, various embodiments are directed to dynamic cooling for a circuit package that allows integration of operationally temperature dependent circuitry into a single circuit package with a relatively small form factor. FIGS. 3A-3E illustrate a block representation of portions of an example vehicle 300 configured in accordance with assorted embodiments to employ dynamic cooling. While a vehicle 300 can employ numerous sensors with matching, or different constructions, the non-limiting example embodiment of FIG. 3A has a single sensor 302 that consists of at least one circuit package 304 that is arranged as physically contacting components connected via electrical interconnects.

The sensor circuit package 304, in one embodiment, consists of one or more optical circuits configured to provide LiDAR optical sensing and/or detection, such as a laser, laser gain chip, detector, mirror, phase array, amplifier, or combination thereof, which can collectively be characterized as optical components 306. The optical components 306 are physically and electrically coupled to at least one circuit configured to provide computing capabilities to the package 304, such as a field programmable gate array, application specific integrated circuit, microprocessor, controller, memory, cache, system-on-chip, or combination thereof, which can be characterized as computing components 308. It is noted that the assorted circuitry of the optical components 306 and computing components 308 can be attached to one or more circuit boards or other non-electrical substrate that is physically integrated into a common structure of the circuit package 304.

Various embodiments of a LiDAR sensor 302 utilize passive and static thermal mitigation structures, such as heat fins or thermal coatings, to control heat and provide operating temperatures within a range that provide peak performance. Such structures can provide efficient thermal management when employed with relatively large physical sizes, which are not conducive to modern vehicle sensors. Hence, current embodiments construct the LiDAR sensor package 304 with a dynamic cooling mechanism 310 that provides different operational modes to allow constituent package circuitry to operate with temperatures within peak performance range for longer periods of time compared to static thermal management structures.

Figure 3A:
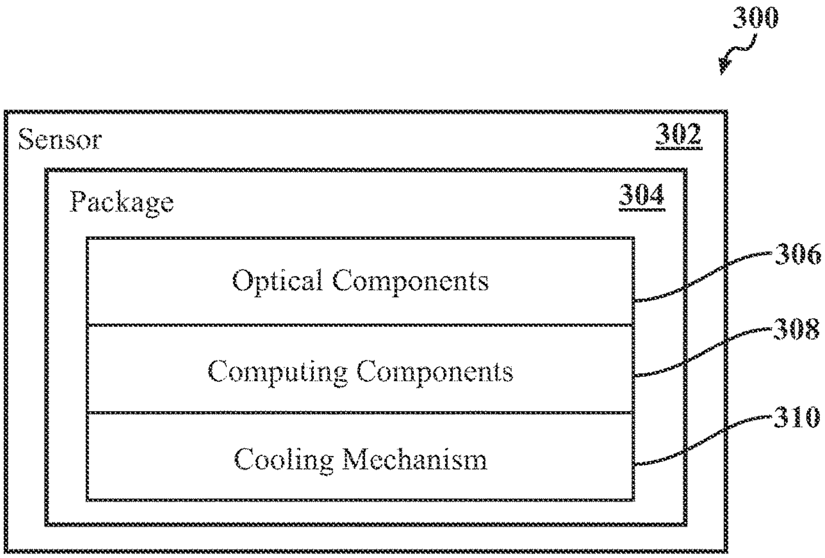
FIGS. 3A-3E respectively illustrate aspects of an example LiDAR package configured in accordance with some embodiments.
Figure 3B:
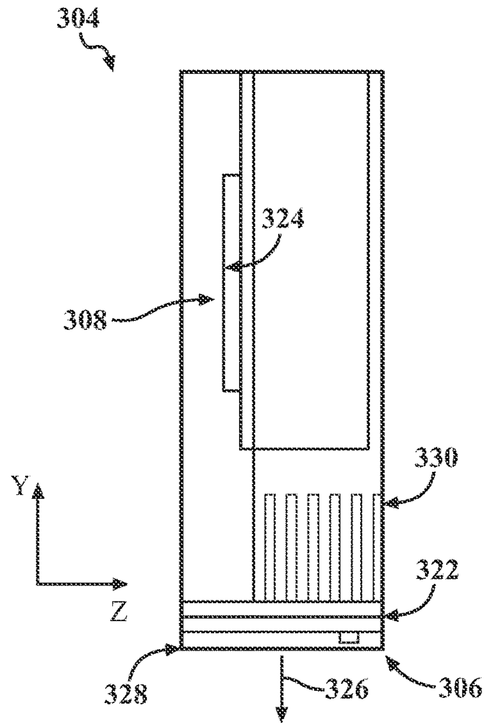
Figure 3C:
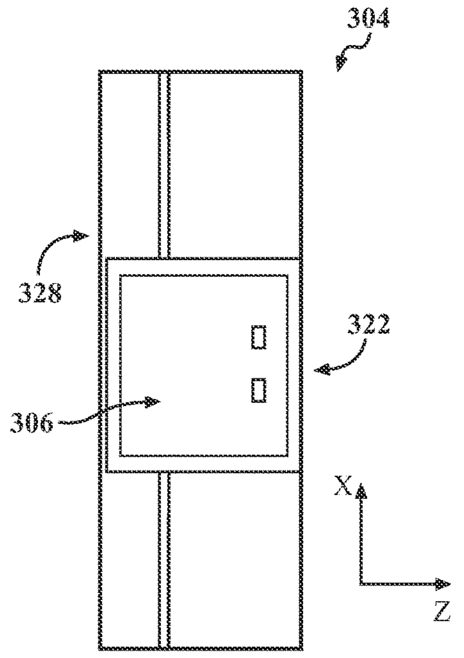

In FIG. 3B, a cross-sectional line representation of the LiDAR sensor package 304 of FIG. 3A is illustrated. The package 304 employs a first circuit 322 and a second circuit 324 that operated together to sense objects and surfaces positioned downrange, as conveyed by solid arrow 326. The first circuit 322 may contain optical components 306 positioned at a front edge/surface of the package 304 to allow optical beams to be emitted and received without obstruction. The optical components 306 of the first circuit 322 can operate with relatively lower power consumption and with a higher peak performance operating temperature range than the computing components 308 of the second circuit 324. That is, the electrical aspects of the first circuit 322 can, on average, draw lower amounts of electrical power during operation and operate at peak performance in a higher temperature range than the electrical aspects of the second circuit 324.

Although not limiting, the range of peak performance operating temperature relative to the average operating temperature of the circuit package in which the circuit is positioned can be characterized as operating temperature sensitivity. In other words, operating temperature sensitivity can correlate the size and values of the peak performance operating temperature of a circuit, or collection of circuits, with one or more operating temperatures of the collective components 306/308 of the package 304. As such, a circuit with high temperature sensitivity has greater cooling requirements than a circuit with low temperature sensitivity.

With operating temperate sensitivity in mind, the circuit package 304 can be physically arranged to provide airflow to the respective circuits 322/324 to maintain each circuit 322/324 in their respective peak performance operating range. The non-limiting example package 304 arrangement shown in FIGS. 3B-3E illustrate how the first circuit 322 is positioned so that airflow initially contacts a front surface, which corresponds with the front of the vehicle and a leading surface 328 of the package 304, as shown in the leading edge view of FIG. 3C. The size of the first circuit 322 allows a static thermal structure 330, such as a heat sink or heat fin array, to provide heat mitigation that is aided by airflow resulting from vehicle movement.

Figure 3D:
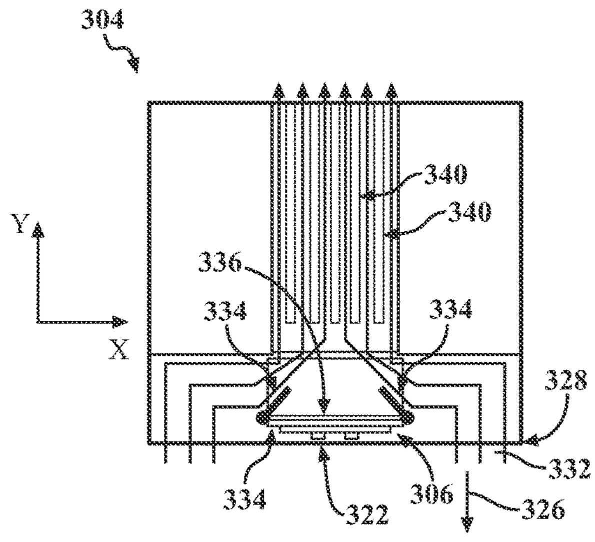
Figure 3E:
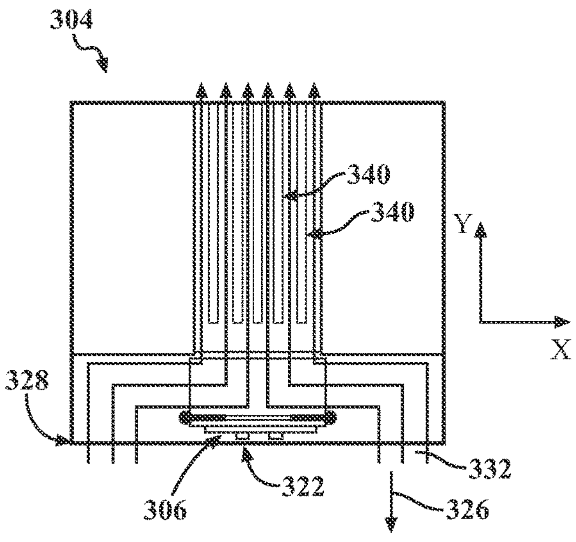

The side view of FIG. 3D and FIG. 3E respectively convey how airflow, as represented by solid lines 332, is manipulated by one or more cooling mechanisms, such as the illustrated access switch 334 that provides dynamic cooling and distinct operating modes relative to the position and temperature sensitivity of the respective constituent package circuits 322/324. A first position of the access switch 334, as illustrated in FIG. 3D, diverts airflow around the trailing portion 336 of the first circuit 322 and into channels 338 of an airflow pathway 340 that connects the first circuit 322 to the second circuit 324. The dual articulating gates of the access switch 334 are shown on opposite lateral sides of the first circuit 322, but such configuration is not required or limiting as the access switch 334 can consist of any number and type of airflow diversion structures, such as a single orifice, flap, or dilating tunnel.

The integration of the second circuit 324 into a position downstream of airflow in the package 304, as conveyed by segmented box 324, can provide space for the various electrical interconnections to be present. However, the size and/or configuration of the second circuit 324 can prevent static thermal management structures, such as sinks or fins, from being utilized. Such lack of static thermal management, along with the lack of direct airflow from vehicle movement, presents thermal management difficulties as heat from the first circuit 322 can travel and transfer to the second circuit 324 via the airflow pathway.

Accordingly, the access switch 334 is configured, in some embodiments, to articulate between a closed mode (FIG. 3D) and an open mode (FIG. 3E) to ensure airflow reaching the second circuit 324 has sufficient capability to cool and maintain the second circuit 324 in a peak performance operating temperature range. While not required or limiting, the access switch 334 may activate to switch between modes via articulation of one or more access members, such as a gate, flap, orifice, or tunnel, in response to a selected operational condition, such as airflow pressure, circuit temperature, airflow temperature, airflow volume, or vehicle speed.

Through the customization of the access switch 334 activation that results in dynamic cooling through distinct airflow routes to the second circuit 324, the package 304 can employ circuitry with diverse temperature sensitivities and static cooling capabilities. The ability to employ the different states and modes of the access switch 334, the volume of air and the temperature of air entering the respective airflow pathway channels 338 can be selectively controlled to provide convective cooling to the second circuit 324 alone or to both circuits 322/324 when appropriate. That is, the leading side of the first circuit 322 will enjoy free and direct airflow regardless of the activated state of the access switch 322 while the trailing surface 336 of the first circuit 324 will experience airflow volume dictated by the state and position of the access switch 334, which can mitigate heat generated by the first circuit 322 from degrading the cooling capabilities of the airflow diverted to the second circuit 324.

In some embodiments of the access switch 334, more than two states are available for selection based on one or more operational parameters. For instance, the access switch 344 may have a continuously variable gate, flap, plate, or diaphragm that provides three or more positions that respectively correspond with different volumes of air reaching the pathway channels 338 and reaching the trailing surface of the first circuit 322 in response to the volume of airflow reaching the access switch. In another non-limiting example, the position of the access switch 334 can be actively selected by a local, or remote, controller in response to multiple different operational parameters, such as circuit temperature, ambient air temperature, second circuit power consumption, and vehicle speed. It is noted that the articulation of portions of the access switch 334 to alter how airflow flows to the pathway channels 336 can be passive or active with any number, and type, of operational parameter being considered.

Figure 4:
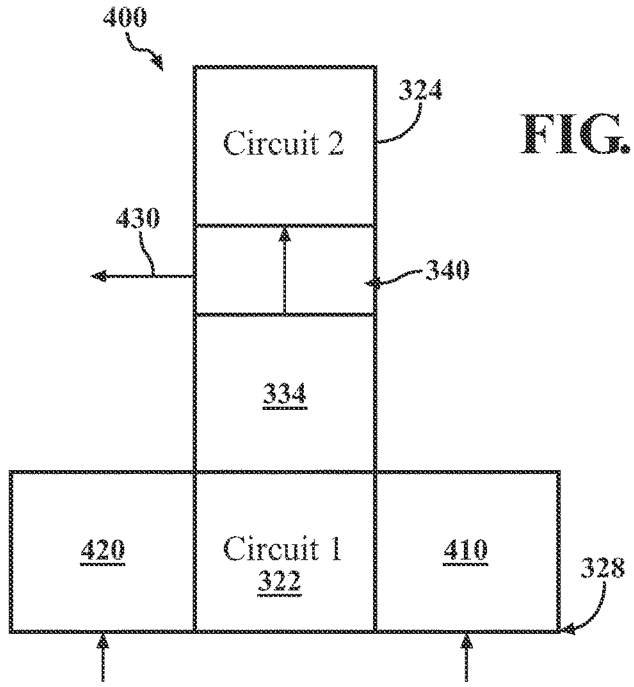
FIG. 4 illustrates one embodiment of a LiDAR package that can be utilized in the LiDAR system of FIG. 2.

With regard to FIG. 4, a block representation of portions of an example sensor package 400 is illustrated. The sensor package 400 can employ any number of electrical circuits that provide any number, and type, of sensor functionality, such as LiDAR beam creation, emission, receiving, and processing. The non-limiting sensor 400 shown in FIG. 4 conveys how a first circuit 322 can is separated from a second circuit 324 by an airflow pathway 340 that continuously extends between circuits 322/324 to a package outlet, as displayed in FIG. 3E. The airflow pathway 340 may be populated with any number of channels, fins, or guides that act to direct airflow to induce convective cooling proximal the second circuit 324.

As illustrated in FIGS. 3B-3E, a sensor package 304 can be configured with air inflow on opposite lateral sides of the first circuit 322, which is collected at the access switch 334 before flowing down the pathway 340. Such configuration is not required, or limiting, but does provide space for multiple airflow restricting mechanisms to be employed to operate in conjunction with the switch 334 positioned at the throat of the airflow pathway to customize airflow to provide maximum cooling for the operational conditions, such as wind, sensor velocity, humidity, circuit power consumption, and engine temperature.

An example use of airflow manipulating mechanisms involves employing multiple separate, but matching, switches 410/420 on opposite lateral sides of the first circuit 322 on the leading edge of the sensor package, as generally shown in FIG. 4. The availability of each switch 334/410/420 to individually alter airflow volume allows for relatively precise control of the amount, and temperature, of airflow reaching the second circuit 322. Other non-limiting embodiments of the sensor package 400 position a single switch on one lateral side of the first circuit 322 on the leading edge that can act alone, or in combination with the centrally positioned switch 334. Another example embodiment positions different types of switches 410/420 on the leading edge of the sensor package to provide different airflow manipulations based on matching, or dissimilar, operational parameters, such as airflow pressure, circuit temperature, or vehicle speed.

It is contemplated that one or more switches 334/410/420 are positioned to control airflow access to one or more channels of the airflow pathway 340. A switch 334/410/420, in some embodiments, can control airflow access to a vent 430 that exits the sensor package 400 without passing by the second circuit 324. That is, a vent 430 can divert airflow downstream from the first circuit 322 to avoid the second circuit 324. Such vent 430 operation can allow the sensor package 400 to selectively avoid passing airflow proximal to the trailing surface of the first circuit 322 and/or passing airflow past the second circuit 324 close enough to alter the temperature of the second circuit 324, which can prevent hot air from raising the temperature of the second circuit 324.

With the ability to configure a sensor package 400 with multiple switches 334/410/420, the volume and conditions of airflow can be manipulated to provide optimal cooling of selected circuits 322/324. For instance, one or more switches 334/410/420 can prevent heat from the first circuit 322 from reaching the second circuit 324 or prioritize cooling of the first circuit 322. The ability to employ different types of switches 334/410/420 in the sensor package 400 can allow dynamic cooling in a diverse range of operational parameters, such as combinations of airflow pressure, volume, and temperature.

FIGS. 5A-5E respectively illustrate different switches that can be utilized in a sensor package, such as package 304 of FIGS. 3A-3E or package 400 of FIG. 4. The example switch 510 of FIG. 5A positions a gate 512 to close, and prevent airflow through, an airflow pathway 514, which may be one or more channels 338 of a larger pathway. The gate 512 is configured to hinge about one or more fixed axes 516 in response to a predetermined airflow pressure or volume, as shown by segmented lines.

The manner in which the gate 512 opens and the airflow conditions that move the gate 512 to allow airflow through the pathway 514 are not limited to a particular configuration, but can be arranged to provide a range of opening 518 sizes. Some embodiments configure the switch 500 with one or more mechanical features, such as a spring or coil, to maintain the gate 512 position to close the pathway 514 until sufficient airflow pressure forces the gate 512 to move and create an opening 518. Other embodiments utilize non-mechanical features to control operation of the gate 512, such as a magnetic or hydraulic piston or damper. The use of a mechanical and/or non-mechanical feature to hold the gate 512, or a series of multiple gates, in position to close the pathway 514 until a preset airflow condition moves the gate 512 to create an opening 518 that allows airflow to pass can be characterized as a passive switch.

Figure 5A:
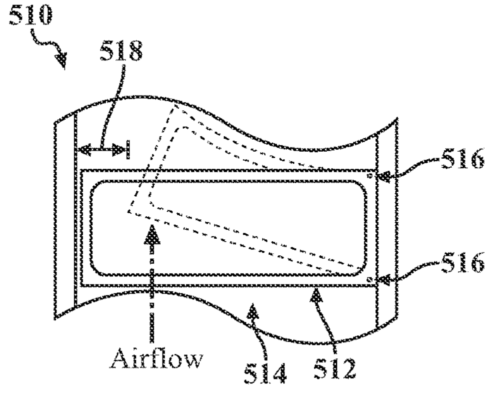
FIGS. 5A-5E respectively illustrate embodiments of airflow access mechanisms that can be incorporated into a LiDAR package.
Figure 5B:
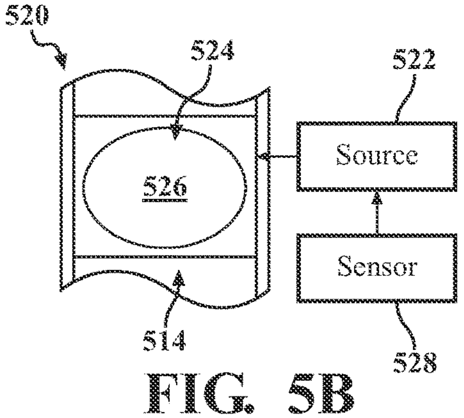

In contrast to the passive movement of the gate in the switch 510 of FIG. 5A without a control signal, a switch 520 can operate solely in response to a control signal from a source 522, such as a controller of a local, or remote, computing device. While not required or limiting of active switches, the switch 520 of FIG. 5B has an electronically actuated door 524 that can move to partially, or completely, expose an opening 526. It is contemplated that the switch 520 can have a default condition with the opening 526 exposed, or covered when an electronic signal is not present.

The use of an electronically activated door 524 allows nearly any operating parameter to trigger movement of the door 524 to any position relative to the opening 526 that allows access to a downstream airflow pathway or channel. For example, the signal source 522 can react to any detected, or predicted, operational parameter from one or more connected sensors 528 by opening, or closing, the door 524. As such, some embodiments utilize redundant, or different, operational readings from multiple sensors 528 to calculate a door 524 position that provides airflow volume that is optimal for package cooling.

Figure 5C:
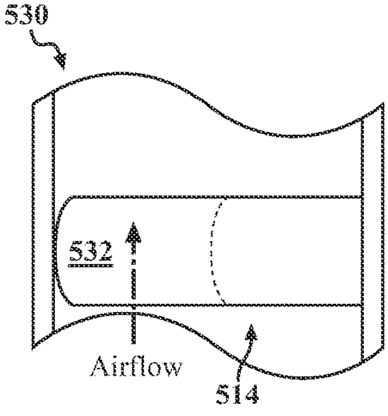

FIG. 5C illustrates portions of another example passive switch 530 that physically reacts to a predetermined temperature to create a pathway opening and allow airflow to pass. Although not required, the switch 530 can be arranged as a thermal diode with one or more members 532 that move in response to a predetermined temperature, as conveyed by segmented line that creates an opening, which can correspond with opening or closing access to an airflow pathway 340 or channel 338.

Figure 5D:
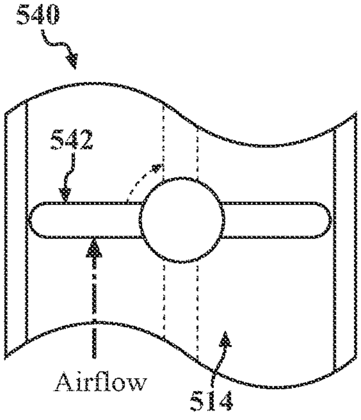

In FIG. 5D, another example passive switch 540 is illustrated. The switch 530 can employ any number of plates 542 that rotate in response to a predetermined airflow pressure to allow access to the downstream airflow pathway, or channel. The position of a switch plate 542 can be controlled by any mechanical, magnetic, hydraulic, or pneumatic element that applies force on the plate 542 to close the pathway until a set airflow pressure.

Figure 5E:
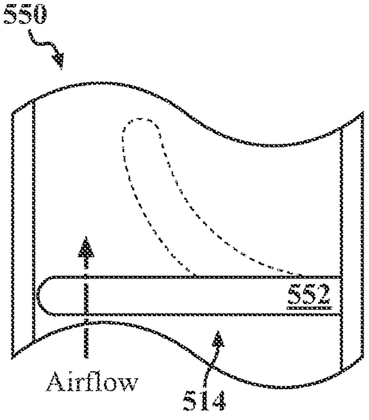

Some embodiments of a passively activated airflow pathway switch 550 involve a single flap 552, as illustrated in FIG. 5E. The shape, material, and size of the flap 552, in accordance with some embodiments utilize a shape memory to flex between a closed state (solid line) and an open state (segmented line) in response to temperature and/or airflow pressure. The shape memory of the flap 552 then returns to the closed state passively when the operational conditions are not present.

Figure 6:
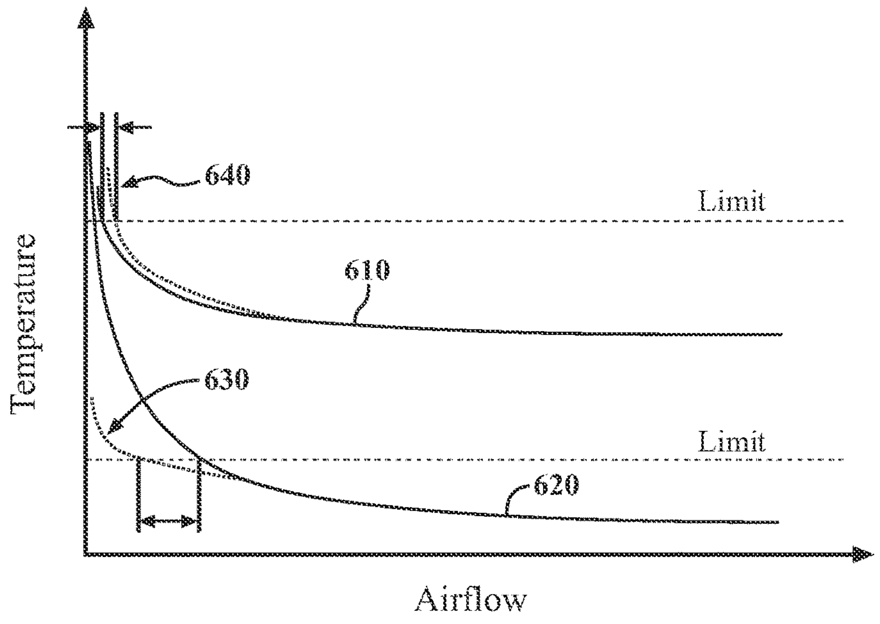
FIG. 6 illustrates operational data associated with an embodiment of a LiDAR package utilized in accordance with some embodiments.

With regard to FIG. 6, operational data is illustrated from an example LiDAR sensor consisting of a single circuit package configured and operated like the package 304 of FIGS. 3A-3E. Line 610 illustrates the temperature of a first circuit positioned on the leading edge of the circuit package while line 620 illustrates the temperature of a second circuit of the package positioned downstream of an airflow access switch that is activated in response to a predetermined amount of airflow pressure. Segmented line 630 conveys how diverting airflow at low airflow pressures, such as when a vehicle is not moving forward, around the first circuit prevents heat from the first circuit from being carried to the downstream second circuit while the same diversion only slightly raises the temperature of the first circuit, as shown by segmented line 640.

At a predetermined airflow pressure, the airflow is allowed to surround and cool the first circuit without raising the incoming airflow enough to jeopardize the cooling of the second circuit. The dynamic cooling provided by the different modes of the airflow pathway access switch allows the second circuit to have greater operational temperature sensitivity than would be practical if a static cooling structure was present, as conveyed by line 630 reaching below the peak performance temperature maximum for the second circuit during low incoming airflow. For comparison, the first circuit drops below its peak performance temperature maximum at approximately the same low incoming airflow, despite the reduced cooling corresponding with airflow diverted around the trailing surface of the first circuit.

Figure 7:
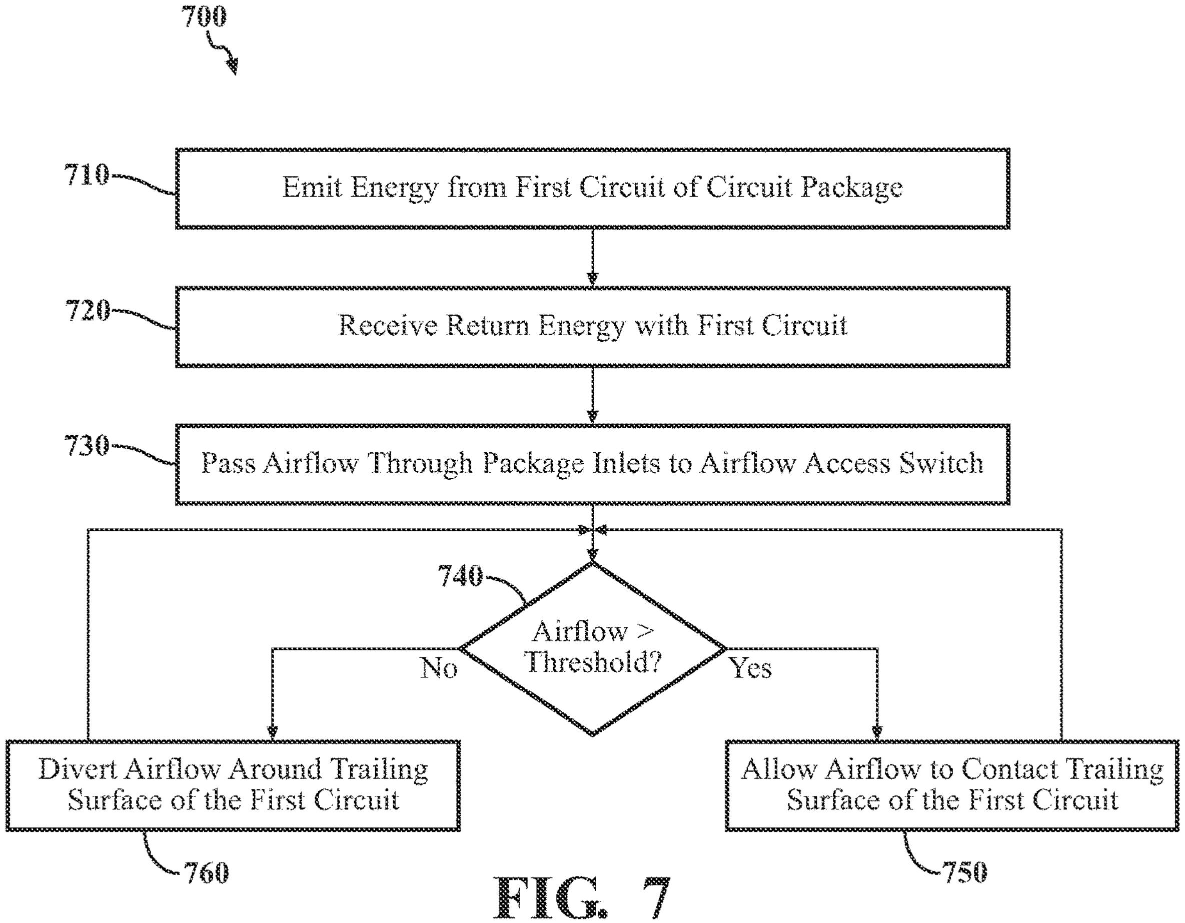
FIG. 7 illustrates a flowchart for one embodiment of a method that is associated with a cooling a LiDAR package.

A circuit package configured in accordance with the embodiments shown in FIGS. 3A-5 and operated in accordance with the data conveyed in FIG. 6 can provide dynamic cooling that allows for a smaller form factor and the incorporation of circuits with different temperature sensitivities. FIG. 7 illustrates a flowchart of an example cooling routine 700 that can be conducted with a circuit package utilized as part of a LiDAR system to detect distant objects and surfaces. It is noted that the cooling routine 700 can begin after a circuit package is constructed as a single unitary package with multiple circuits having different temperature sensitivities separated in the package by an airflow pathway modulated by one or more access switches.

The circuit package may be incorporated into a vehicle before step 710 utilizes the optical capabilities of the first circuit positioned at the leading edge/surface of the circuit package to emit energy in any selected direction relative to the vehicle. The energy emitted in step 710 is not limited to a particular arrangement or type, but can be multiple separate beams of energy within a selected frequency range and/or wavelength that are emitted concurrently or sequentially.

Resultant energy is received by the circuit package in step 720 and processed to determine the location, velocity, and direction of objects and surfaces. It is contemplated that steps 710 and 720 are conducted either with, or without, airflow passing through the circuit package. That is, the transmission and reception of energy in steps 710 and 720 can occur while the vehicle is moving, or stationary, which corresponds with airflow being forced into the circuit package. Some embodiments of routine 700 conduct steps 710 and 720 with the airflow access switch of the circuit package in a default position that prioritizes cooling of the more operational temperature sensitive circuit by diverting airflow around heat produced by the less operational temperature sensitive circuit. Such default access switch position may continue, or change, as airflow passes through one or more inlets of the circuit package in step 730 toward the access switch and subsequently to at least one channel of an airflow pathway in a manner determined by the access switch.

As airflow reaches the airflow pathway access switch, decision 740 evaluates if the operational conditions of the circuit package and/or airflow itself are above a predetermined operational threshold. In other words, step 740 determines if the operational parameters of the circuit package are conducive to the access switch being in which physical position. As an example, airflow that reaches the access switch may have ample pressure to open a passive gate, flap, or plate to provide a first cooling mode. In contrast, airflow that does not have sufficient pressure to physically alter the gate, flap, or plate of a passive access switch will maintain the switch in a default physical position that corresponds with a second cooling mode.

With decision 740, any number and type of circuit package operational parameter can be evaluated to provide optimal dynamic cooling conditions. In the event an airflow access switch is configured with passive elements that automatically react to conditions, such as thermal or pressure thresholds, by changing between cooling modes that respectively manipulate airflow in different ways. An actively controlled airflow access switch can allow decision 740 to evaluate a greater range of input information to determine the optimal cooling mode and physical position of doors, flaps, gates, and/or plates of a switch. For instance, an actively controlled access switch can allow decision 740 to evaluate data sensed from positions external to the access switch, such as vehicle speed, engine temperature, circuit temperature, or ambient humidity, to determine the best airflow pathway, as manipulated by the access switch, to maintain the constituent circuits of the circuit package within operational temperatures that provide peak operational performance.

While decision 740 can conduct sophisticated analysis of multiple input parameters to determine what cooling mode, and switch position, provides optimal package cooling, various embodiments arrange a circuit package to passively react to airflow pressure in decision 740, as illustrated in FIG. 7. Hence, the non-limiting circuit package configuration with a passively triggered airflow access switch can react to airflow pressure that is above a predetermined switch threshold by executing step 750 to allow airflow to convectively cool a trailing surface of the first circuit. Conversely, airflow that is below the predetermined airflow pressure threshold automatically triggers step 760 to divert airflow around the trailing surface of the first circuit, which mitigates the heat generated by the first circuit from increasing the temperature of the airflow.

Through the operation of routine 700, an airflow access switch can revisit decision 740 any number of times as airflow pressure, and other operational parameters, change over time. It is understood that vehicle operation often results in drastically different airflow volumes as speed, wind, and pressure change with vehicle speed and environment during transit. Accordingly, steps 750 and 760 can be conducted and repeated numerous times to manipulate airflow and provide enhanced circuit package cooling over time. It is contemplated that the cyclic execution of decision 740 can result in more than two distinct cooling modes and access switch physical positions. For example, a passive switch gate can experience numerous different physical positions that respectively correspond with different volumes of airflow being allowed into one or more pathway channels. Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for detecting objects, comprising:

a circuit package including a first circuit separated from a second circuit by an airflow pathway; and an access switch positioned in the airflow pathway and triggered in response to an encountered package condition by articulating between a first cooling position and a second cooling position to manipulate a flow of air around the first circuit, wherein, in the first cooling position, the access switch diverts the flow of air around a trailing surface of the first circuit and into the airflow pathway toward the second circuit, and, in the second cooling position, the access switch permits the flow of air to reach the trailing surface of the first circuit before entering the airflow pathway toward the second circuit.

2. The system of claim 1, wherein the first circuit is an optical emitter.

3. The system of claim 1, wherein the first circuit is a laser gain module.

4. The system of claim 1, wherein the first circuit has a lower operational sensitivity to temperature than the second circuit.

5. The system of claim 1, wherein the second circuit is an application specific integrated circuit.

6. The system of claim 1, wherein the second circuit is a field programmable gate array.

7. The system of claim 1, wherein the access switch includes an articulating gate on opposite sides of the first circuit.

8. The system of claim 1, wherein the access switch includes a gate articulated to the second cooling position by a signal from a connected controller.

9. The system of claim 1, wherein the access switch includes a gate articulated to the second cooling position in response to the encountered package condition, the encountered package condition includes an airflow temperature detected above a threshold value.

10. The system of claim 1, wherein the encountered package condition is airflow pressure detected above a threshold value.

11. The system of claim 1, wherein the airflow pathway includes multiple separate channels each continuously extending from the access switch to an outlet of the circuit package.

12. An apparatus comprising:

a single circuit package including a first circuit positioned on a leading edge and separated from a second circuit by an airflow pathway;

a first access switch positioned within a flow of air to a first portion of the airflow pathway; and a second access switch positioned within the flow of air to a second portion of the airflow pathway, the first access switch and second access switch collectively manipulating the flow of air in response to an encountered package condition by articulating between a first cooling position and a second cooling position, wherein, in the first cooling position, the first and second access switches collectively divert the flow of air around a trailing surface of the first circuit and into the airflow pathway toward the second circuit, and, in the second cooling position, the first and second access switches permit the flow of air to reach the trailing surface of the first circuit before entering the airflow pathway toward the second circuit.

13. The apparatus of claim 12, wherein the first access switch is different than the second access switch.

14. The apparatus of claim 12, wherein the first access switch is positioned upstream of the second access switch.

15. The apparatus of claim 12, wherein each access switch restricts the flow of air to less than all of the airflow pathway.

16. A method for cooling a circuit package, the method comprising:

diverting airflow around a first circuit with an access switch positioned in an airflow pathway separating the first circuit from a second circuit; and activating the access switch in response to an encountered package condition to articulate the access switch between a first cooling position in which the airflow is diverted around a trailing surface of the first circuit and into the airflow pathway toward the second circuit, and a second cooling position in which the airflow reaches the trailing surface of the first circuit before entering the airflow pathway toward the second circuit.

17. The method of claim 16, wherein activating the access switch includes determining whether the airflow pressure reaches a predetermined pressure.

18. A method for cooling a circuit package, the method comprising:

diverting airflow around a first circuit with an access switch positioned in an airflow pathway separating the first circuit from a second circuit; and activating the access switch in response to an encountered package condition to articulate the access switch between a first cooling position and a second cooling position to manipulate a flow of air around a trailing surface of the first circuit prior to entering the airflow pathway, wherein activating the access switch includes movement of a vehicle in which the first circuit and second circuit each reside.

19. The method of claim 16, wherein activating the access switch includes detecting temperature in the circuit package.

20. The method of claim 19, wherein the detected temperature is of the second circuit.

* * * * *